(12) United States Patent
Alm et al.

(10) Patent No.: US 7,505,635 B2
(45) Date of Patent: Mar. 17, 2009

(54) METHOD AND APPARATUS FOR DIGITALLY PROCESSING FREQUENTLY UPDATED IMAGES FROM A CAMERA

(75) Inventors: Carl-Axel Alm, Lund (SE); Gunnar Dahlgren, Gothenburg (SE); Per Kannermark, Malmo (SE); Stefan Lundberg, Malmo (SE)

(73) Assignee: Axis AB, Lund (SE)

( * ) Notice: Subject to any disclaimer, the term of this patent is extended or adjusted under 35 U.S.C. 154(b) by 665 days.

(21) Appl. No.: 10/398,983

(22) PCT Filed: Sep. 26, 2001

(86) PCT No.: PCT/SE01/02067

§ 371 (c)(1),
(2), (4) Date: Sep. 2, 2003

(87) PCT Pub. No.: WO02/30122

PCT Pub. Date: Apr. 11, 2002

(65) Prior Publication Data

US 2004/0028292 A1 Feb. 12, 2004

(30) Foreign Application Priority Data

Oct. 4, 2000 (SE) .................................. 0003570

(51) Int. Cl.
*G06K 9/32* (2006.01)
*G09G 5/00* (2006.01)
*G09G 5/10* (2006.01)
*H04N 5/44* (2006.01)
*H04N 9/74* (2006.01)
*H04N 3/233* (2006.01)

(52) U.S. Cl. ...................... 382/298; 345/660; 345/698; 348/561; 348/581; 348/582; 348/704

(58) Field of Classification Search ......... 382/298–300; 345/660–671, 689, 698–699; 348/561, 581, 348/582, 704, 441; 358/451, 428, 525; 708/208, 708/290

See application file for complete search history.

(56) References Cited

U.S. PATENT DOCUMENTS

| 4,692,806 A | | 9/1987 | Anderson et al. |
| 5,128,776 A | | 7/1992 | Scorse et al. |
| 5,872,874 A | * | 2/1999 | Natarajan .................... 382/298 |
| 5,920,327 A | * | 7/1999 | Seidensticker, Jr. ......... 345/561 |

(Continued)

FOREIGN PATENT DOCUMENTS

EP  0 528 084 A1  2/1993

*Primary Examiner*—Matthew C Bella
*Assistant Examiner*—Randolph Chu
(74) *Attorney, Agent, or Firm*—Volpe and Koenig, P.C.

(57) ABSTRACT

The invention relates to a method and a system for digitally processing of frequently updated images from a camera.

The system comprises at least one camera (2), at least one display unit, a network (6) for connecting the at least one camera with at least one display unit, and an image processing means (30).

The image processing means comprises means for defining a first scaling area and a peripheral scaling area, which is enclosing the first scaling area, within an acquired digital image, and means for scaling the peripheral scaling area differently than the first scaling area so that the peripheral scaling area is downscaled in relation to the first scaling area, wherein the first scaling area is uniformly scaled in both a vertical and a horizontal direction.

4 Claims, 12 Drawing Sheets

U.S. PATENT DOCUMENTS 6,195,101 B1 * 2/2001 Ghislain Bossut et al. .. 345/629
6,360,029 B1 * 3/2002 Moller ...................... 382/298
6,681,059 B1 * 1/2004 Thompson ................. 382/298
7,124,427 B1 * 10/2006 Esbensen .................... 725/109

* cited by examiner

METHOD AND APPARATUS FOR DIGITALLY PROCESSING FREQUENTLY UPDATED IMAGES FROM A CAMERA

TECHNICAL FIELD OF THE INVENTION

The present invention relates to a method of digitally processing frequently updated images from a camera. Further, the present invention relates to a system, a camera, and a presentation unit performing digital processing of frequently updated images.

BACKGROUND ART

Systems for distributing and presenting images from cameras are often used in applications for surveillance, inspection, security, and/or remote sensing. Processing of images in such systems is known. For example, in U.S. Pat. Nos. 5,185,667 and 5,359,363, there is described a device for omnidirectional image viewing. The imaging device is based on mathematical correction of a circular image obtained from a fisheye lens. The device is preferably used to provide a wide viewing angle without having to rotate the camera that is acquiring the images.

In some situations the distributed images does not fit into the presentation application and then have to be adapted to the size allowed by the application. Currently, the normal way of making images from a camera suit such an application is to scale down or crop the images to suitable size. However, by scaling down or cropping the images important visual information will be reduced or erased from the presentation of the images.

In U.S. Pat. No. 4,605,952 there is described means and a method for-providing a television signal format where the increased vertical resolution and the wider aspect ratio of a High Definition Television service can be achieved and where the signal format still is compatible with existing standard receivers. The patent document discloses a television studio camera provided with processing equipment for changing the aspect ratio of the image from the camera and for transforming it to a standard definition television image. The change of aspect ratio is achieved by compressing the central part of each line and compressing the beginning and the end of each line nonlinearly. Then samples from alternate lines are selected and combined to make up the standard television image.

SUMMARY OF THE INVENTION

One object of the present invention is to reduce the height and width of frequently updated images, which are acquired by means of a camera, and simultaneously preserve important visual information.

The object of the present invention is achieved by means of a method of digitally processing frequently updated images according to claim 1, by means of a system according to claim 13, by means of a camera according to claim 17, by means of a presentation unit according to claim 21, and by means of a computer program product according to claim 26. Preferred embodiments of the present invention are defined in the dependent claims.

More particularly, according to one aspect of the invention, a method of digitally processing frequently updated images from a camera, comprises the steps of defining a first scaling area and a peripheral scaling area, which encloses the first scaling area, receiving an updated image, scaling the peripheral scaling area differently than the first scaling area so that the peripheral scaling area is downscaled in relation to the first scaling area, wherein the first scaling area is uniformly scaled in both a vertical and a horizontal direction.

An advantage of the method of the present invention is that the quality of the images are preserved in an area of interest, i.e. the first scaling area, while the height and the width of the images are decreased. Further, the visual information of the area of lesser interest, i.e. the peripheral area, is reduced and not erased. This results in that the portion of the image within the first scaling area is presenting a portion of an image in which objects is fully identifiable, while the peripheral scaling area is presenting a portion of an image in which it could be difficult to identify objects, but where it at least is possible to recognise a movement of an object.

For example, the first scaling area could be covering a door, while the peripheral scaling area is covering the area surrounding the door. Thus, a person looking at the images is able to visually detect a movement in the peripheral scaling area. The movement will alert the person and draw his attention to the image. The person will then be able to identify the object of the movement when the object enters the first scaling area.

In one preferred embodiment said method is utilised to downscale the images for presentation of more than one image simultaneously on one display unit. Thus, such an application would save both space and money without reducing the important information of the image.

According to a preferred embodiment of the invention the method further comprises the step of dynamically changing the appearance of said peripheral scaling area in response to instructions for moving the position of the first scaling area within the image boundaries.

An advantage of this embodiment of the invention is that a person viewing the images from a camera is able to move the first scaling area for identifying the cause of a movement that have been perceived in the peripheral area or just for changing the area of interest without having to physically turn or move the camera.

According to another aspect of the invention a system for acquiring and presenting images of a specific environment for a user, comprises at least one camera, at least one display unit, a network for connecting the at least one camera to at least one display unit, and an image processing means. The image processing means of said system comprises means for defining a first scaling area and a peripheral scaling area, which is enclosing the first scaling area, within an acquired digitised image, and means for scaling the peripheral scaling area differently than the first scaling area so that the peripheral scaling area is downscaled in relation to the lo first scaling area, wherein the first scaling area is uniformly scaled in both a vertical and a horizontal direction.

An advantage of having the image processing means positioned in a device for distributing the images to at least one display unit is that such arrangement saves bandwidth in the network connecting the device for distributing images with the at least one display unit. A further advantage of this arrangement is that it makes it possible to store non-processed images for later use at a device for distributing the images.

The advantage of saving bandwidth also applies to an embodiment where the scaling method is implemented in an image processing means in the camera.

In a preferred embodiment the invention is part of a system for surveillance, inspection, security, and/or remote sensing.

In the context of the invention, downscaling of an image means that the size of the image is decreased. A downscale in the direction of X by a downscale factor sx corresponds to a multiplication of the size of the image in said direction with a scale factor 1/sx.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail with reference to the accompanying drawings, in which.

DETAILED DESCRIPTION OF PREFERRED EMBODIMENTS OF THE INVENTION

Figure 1:
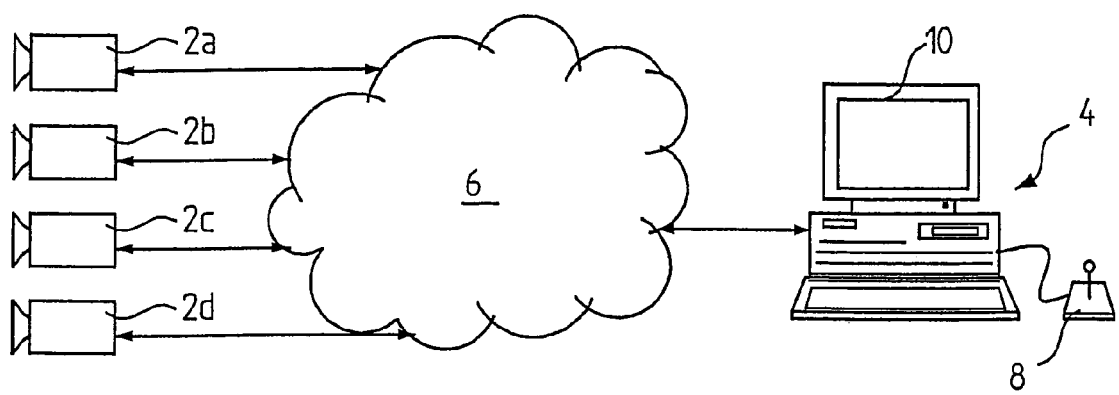
FIG. 1, is a schematic view of a system in which preferred embodiment of the invention is to operate.

FIG. 1 illustrates a system utilising an embodiment of the invention. In the figure there is shown four cameras 2a-d being connected to a presentation unit 4 via a network 6.

In a preferred embodiment of the system the cameras 2a-d are sending frequently updated digital images over the computer network 6 to at least one computer functioning as a presentation unit 4. The digital images are preferably coded and could for example be coded by using the JPEG standard or any other suitable coding. In the preferred embodiment the images are either sent as separate files or by means of streaming. At the site of the computer 4 there is provided a control means 8. The control means is preferably arranged for controlling pan and tilt functions of the images. In the preferred embodiment four digital images are presented simultaneously on the display device 10 of the computer 4. Thus, saving both space and equipment in comparison with having the images presented on four separate display devices. Depending on the purpose of the presentation of the image and/or features of a presentation application it could be advantageous to present just one image on the display 10. There could also be reasons to present any number of images simultaneously on the display 10.

Figure 2:
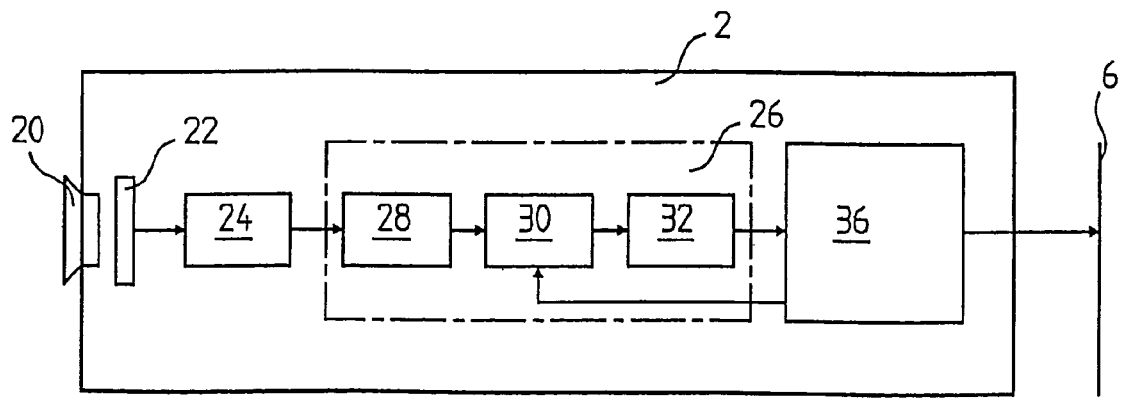
FIG. 2, is a schematic view of a camera according to the invention.

In FIG. 2, there is presented a schematic view of a camera 2 according to a preferred embodiment of the invention. The camera produces an image stream in which each image is processed. The camera 2 comprises a lens 20 for projecting an image of the environment onto an image sensor 22, which, for example, could be of CCD- or CMOS-type. The output of the image sensor 22 is then processed in an analogue processing means 24 in a way that is known to a person skilled in the art. The output of the analogue processing means 24 is then forwarded to a digital, processing means 26. In the digital processing means 26 the image is processed by an image DSP 28 (Digital Signal Processor), a scaling means 30, and a JPEG compression means 32. The image DSP 28 creates an image from received raw sensor data and processes the image to enhance the quality by eliminating various types of noise, filtering etc. The DSP 28 could for example be a SAA8110G DSP from Philips Semiconductors. The scaling means 30 processes the image from the DSP 28 in a manner that will be described later in this document. The image processed by the scaling means 30 is then processed in a JPEG compression means 32 for converting the image to the JPEG format. Then the output from the digital processing means 26 is passed to a network controller 36, in which the image is handled by a network protocol stack and sent over the computer network 6 via a network interface in the camera 2. The network controller 36 preferably acts as a network server.

Further the network controller 36 is arranged to receive control commands from the computer network 6 for controlling the function of the camera 2 and the image processing functions. One of the control commands is a command for moving an area of interest used in the scaling means, the area of interest is further explained below. Other control commands could for instance be commands for changing the scale factors of the scaling areas.

Now referring to FIG. 3 and FIG. 4, the scaling means is arranged to process the digital image it receives as input as follows. In the received image there is defined logical scaling areas. These scaling areas are an area of interest 101, called a first scaling area, and a peripheral scaling area 102, 103, 104, 105, including a second scaling area 102 defined as the area above line 112, a third scaling area 103 defined as the area below line 113, a fourth scaling area 104 defined as the area to the left of line 114, and a fifth scaling area 105 defined as the area to the right of line 115. The lines 112 and 113 are extending in a horizontal direction and the lines 114 and 115 are extending in a vertical direction.

The peripheral scaling areas 102, 103, 104, 105 of the image is then downscaled in relation to the first scaling area.

The downscaling of the peripheral area 101 is preferably performed by downscaling the second scaling area 102, the third scaling area 103, the fourth scaling area 104, and the fifth scaling area 105. The second and the third scaling areas 102, 103 are only downscaled in the vertical direction, thus maintaining the size in the horizontal direction, and the fourth and fifth scaling areas 104, 105 are only downscaled in the horizontal direction, thus maintaining the size in the vertical direction. Further, the scaling areas 102, 103, 104, 105, of the peripheral scaling area is arranged so that the second scaling area 102 is overlapping the fourth 104 and the fifth 105 scaling areas, thus the areas of overlap 116, 119, is scaled in both the horizontal direction and the vertical direction. The same applies to the third scaling area 103 which also is overlapping the fourth 104 and the fifth 105 scaling areas.

In a preferred embodiment the second and the third scaling areas 102,103 are downscaled by means of a factor 5 (scaled by means of a factor ⅕) in the vertical direction and the fourth and the fifth scaling areas 104, 105 are downscaled by means of a factor 5 in the horizontal direction. Further, the first scaling area is not scaled at all. When using these scale factors and the scaling areas defined according to FIG. 3 the resulting image will have scaling areas of the size showed in FIG. 4. The values of the scale factors for scaling the scaling areas can vary and be of virtually any value. In some applications it could be interesting to indicate the area of interest in the processed image. This could be made by positioning a frame, e.g. a red line, at the boundaries of the first scaling area or by removing the colour information in the peripheral areas, thus resulting in an area of interest presented in colour surrounded by a black-and-white peripheral area.

Figure 5:
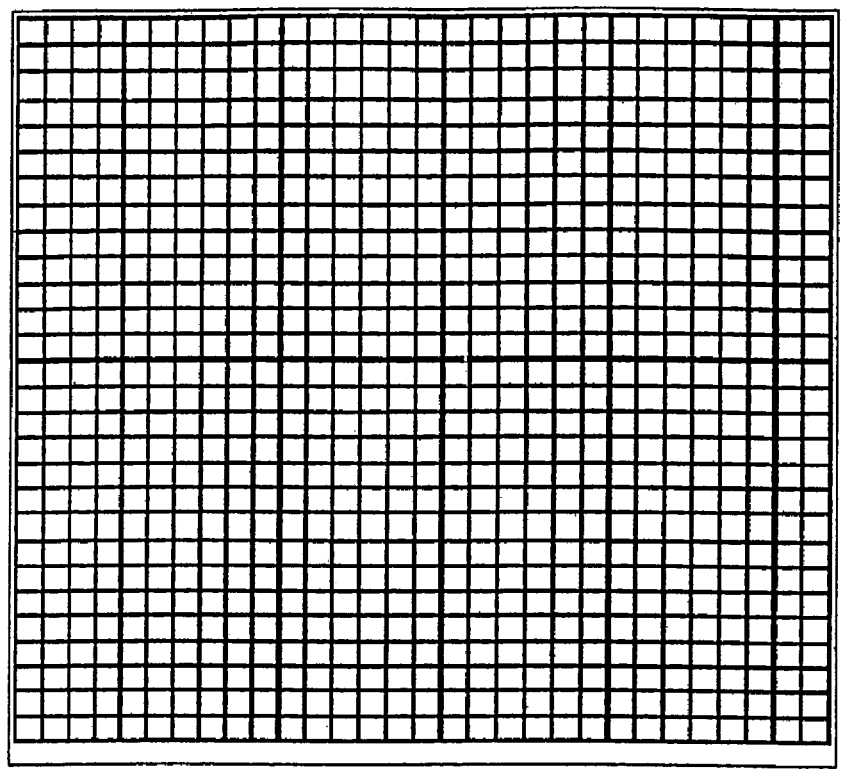
FIG. 5, is showing an image in the form of a line pattern before it has been processed in accordance with an embodiment of the invention.
Figure 6:
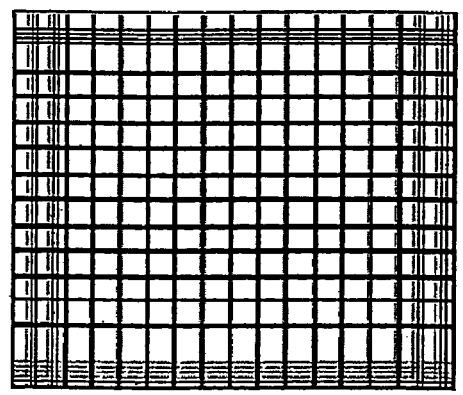
FIG. 6, is showing the image of FIG. 5 when it has been processed in accordance with an embodiment of the invention.

In FIGS. 5 and 6 the image before and after, respectively, scaling, by using the scaling parameters of above, is shown. The peripheral areas are scaled by means of a scale factor that is constant during the scaling of each of the peripheral scaling areas. In another embodiment the downscale factor is changed linearly and increasingly from the boundary of the first scaling area to the boundary of the image.

Figure 7:
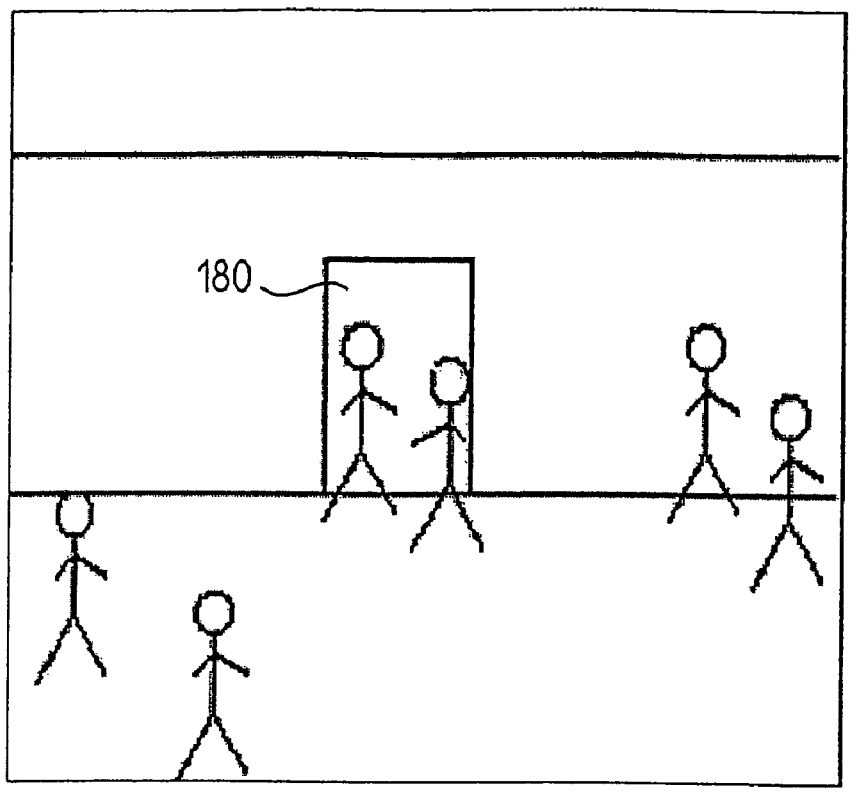
FIG. 7, represents an image from a camera that is used for monitoring an entrance zone of a room.
Figure 8:
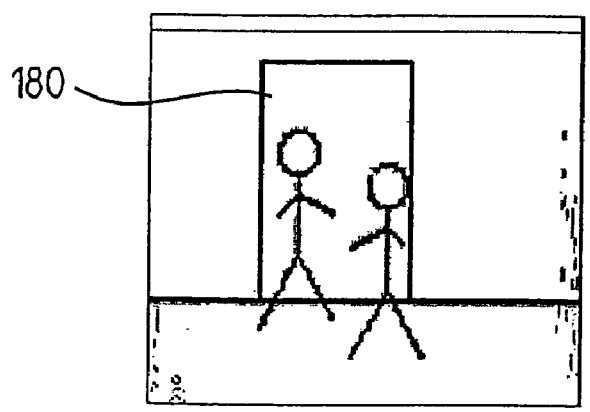
FIG. 8, is showing the image of FIG. 7 when it has been processed in accordance with an embodiment of the invention.

By using the above mentioned technique for downscaling an image, the portion of the image within the first scaling area is presenting an image in which objects are fully identifiable, while the peripheral scaling area is presenting an image in which it could be difficult to identify objects, but where it at least is possible to recognise a movement of a object. This is illustrated by FIG. 7 and FIG. 8, wherein FIG. 7 shows a view from a surveillance camera before image processing and FIG. 8 shows the same view after image processing. The interesting area of the view is the door 180 and, as clearly can be seen in the figures, the quality of this part of the image is preserved, thus the objects in this part is not distorted and is clearly identifiable. The peripheral area is distorted and objects within this area could be hard to identify, however it would be easy to visually detect a movement in this area.

In a preferred embodiment of the present invention the user is able to change the position of the area of interest (the first scaling area), e.g. for identifying objects in the downscaled and distorted peripheral area. To control the change of position the user utilises an input means, such as a keyboard, mouse, joystick etc. The signals from the input means are transferred to the scaling means were they are interpreted. Preferably, a signal indicating a movement of the position to the right results in a movement of the positions of lines 114 and 115 in FIG. 3 to the right and a signal indicating movement to the left results in a movement of said lines to the left. Accordingly, a signal indicating a movement of the position upward result in an upward movement of the positions of lines 112 and 113 in FIG. 3 and a signal indicating movement to downward results in a downward movement of said lines.

Figure 9:
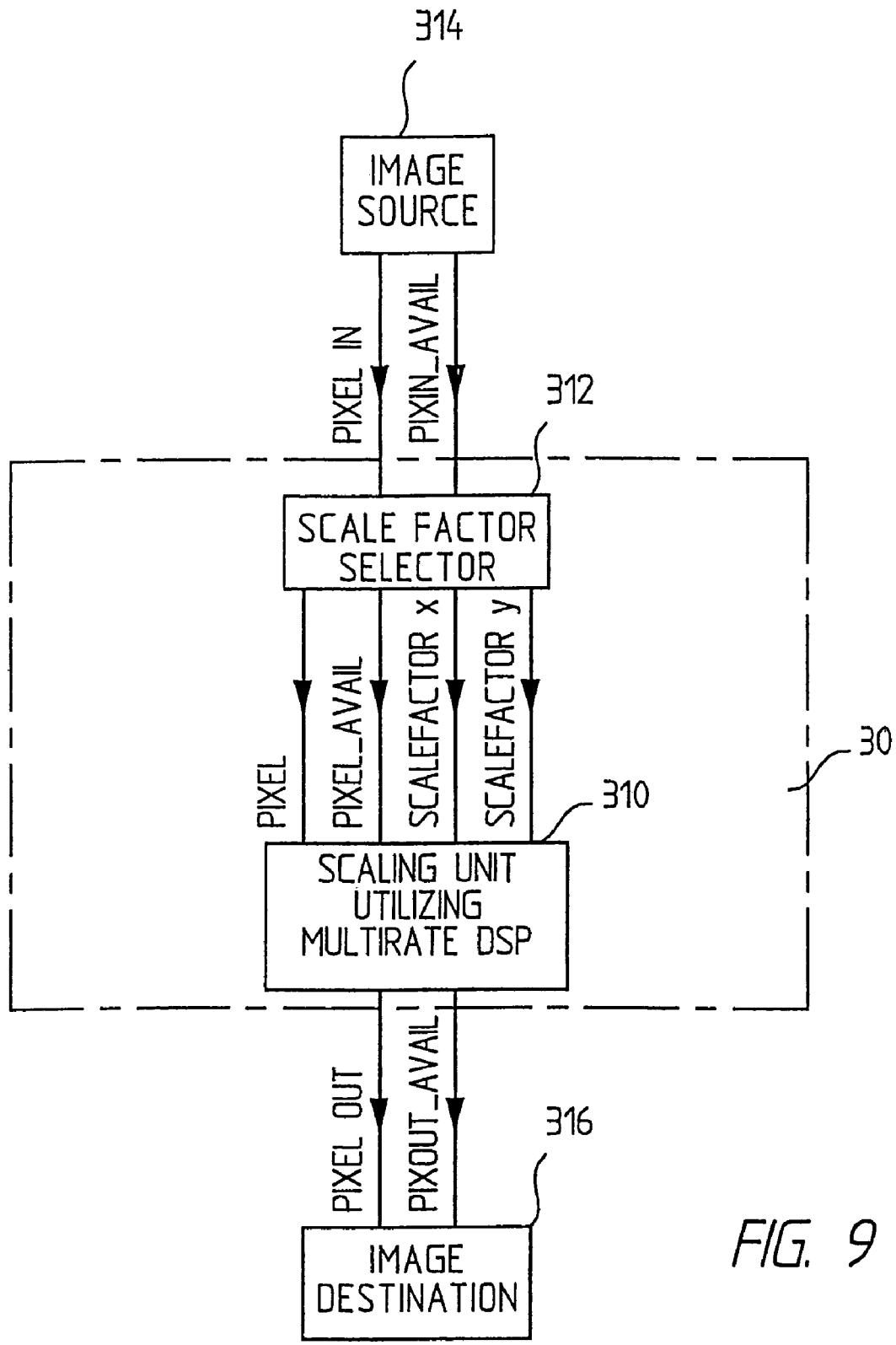
FIG. 9, is a schematic view of a scaling means in a preferred embodiment of the invention.

Now referring to FIG. 9, the scaling means 30 comprises a scaling unit 310 and a scale factor selector 312. The image source 314, which could be the image DSP 28 of FIG. 2, a video camera equipped with some interface circuitry, etc, generates a stream of pixels from an acquired image. The pixels are sent to the scaling means 30 where the scale factor selector 312 and the scaling unit 310 process them. The pixels are sent from the image source 314 to the scale factor selector 312 via the PIXEL IN signal line and when a pixel is available it is signalled to the scale factor selector 312 by means of the PIXIN_AVAIL signal line. The scale factor selector 312 checks the position of the present pixel and provides the scaling unit 310 with the data of the present pixel, PIXEL, a signal indicating that a pixel is available, PIXEL_AVAIL, and the scale factors, SCALE FACTOR x and SCALE FACTOR y, to be used for said pixel. The process of the scale factor selector 312 is further described below and in FIG. 10. Then the scaling unit 310 processes the input values PIXEL, PIXEL_AVAIL, SCALE FACTOR x, and SCALE FACTOR y and produces an output pixel, sent over PIXEL OUT, and a signal indicating that a processed pixel is available, sent over PIXOUT_AVAIL. The resulting pixel stream is then compiled to an output image, e.g. by means of a process as described in the flowchart of FIG. 11, and is forwarded to an image destination 316, e.g. the JPEG compression means 32 in FIG. 2.

Figure 10:
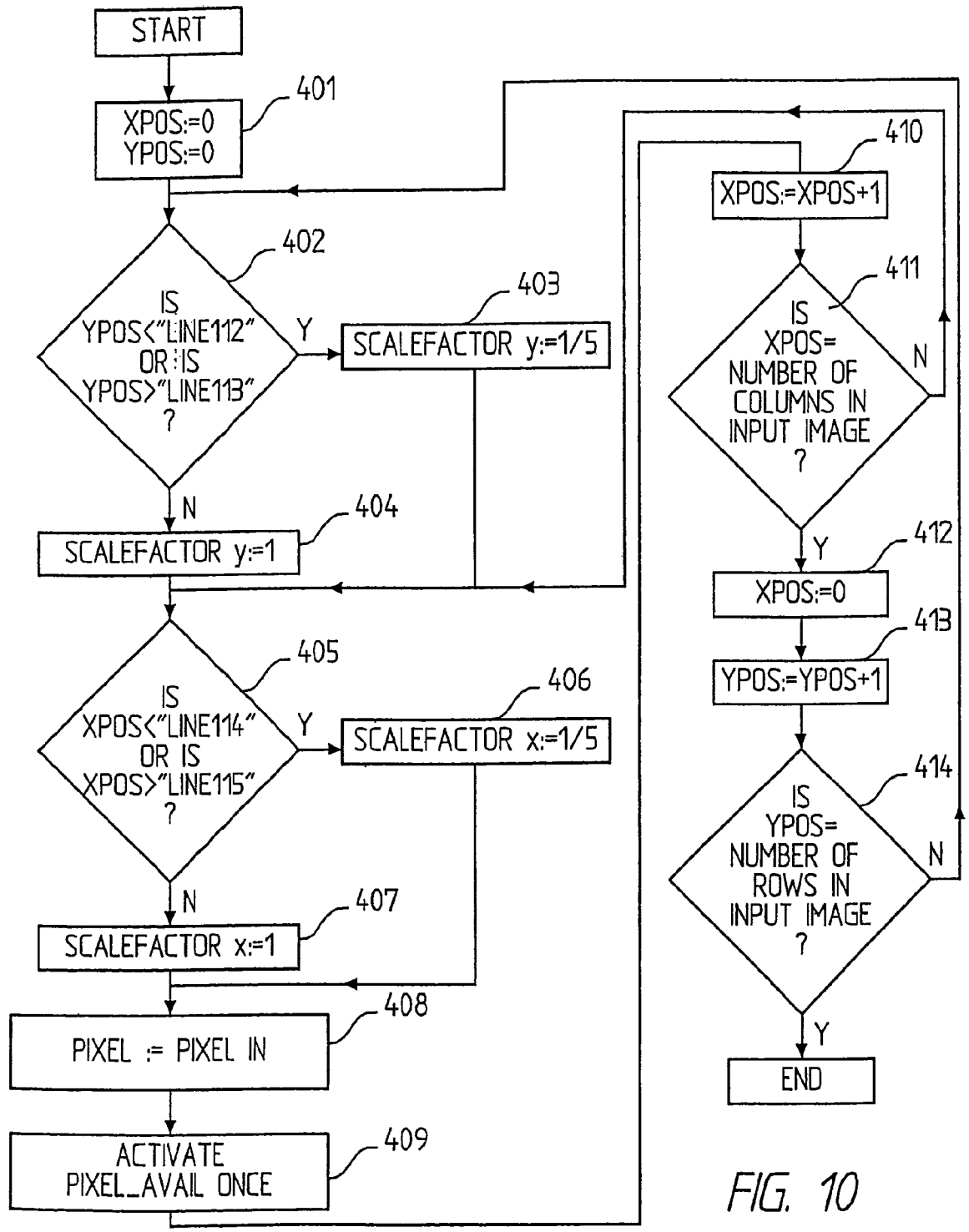
FIG. 10, is a flowchart of a process of the scale factor selector in FIG. 9, FIG. 11, is a flowchart of a process of a preferred embodiment of the scaling means, which process manages the output signals from the scaling unit of FIG. 9 and compiles the pixels to a complete image for transfer.

In FIG. 10 the processing of the image in the scale factor selector is described by means of a flowchart. The processing of a new image is initiated by setting the pixel position variables, XPOS and YPOS, to zero, step 401.

Figure 3:
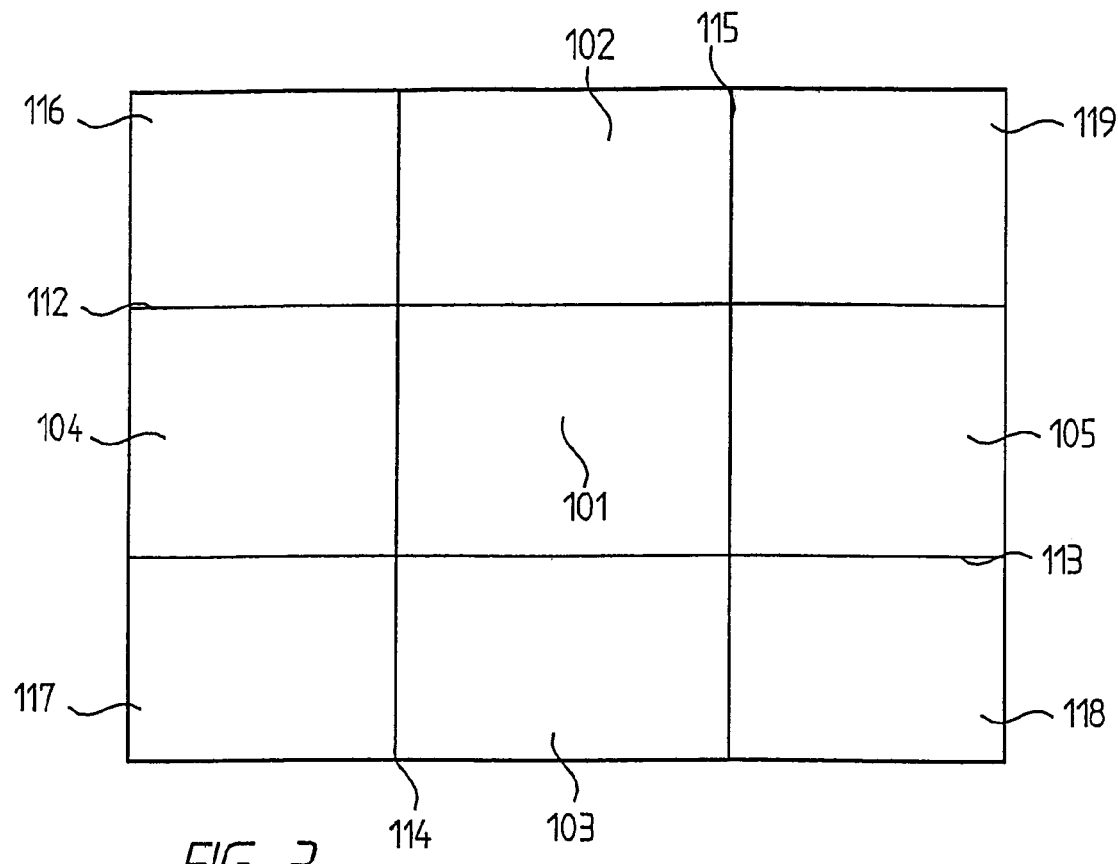
FIG. 3, is showing the defined scaling areas, according to one embodiment of the invention, in an image not yet processed.
Figure 4:
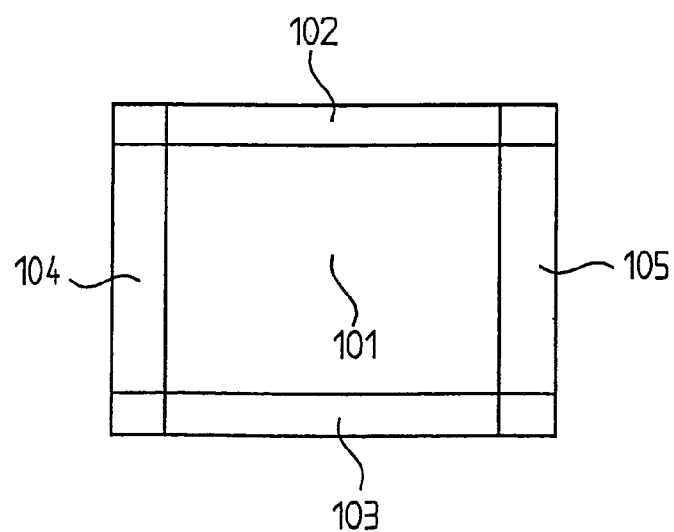
FIG. 4, is showing the scaling areas of FIG. 5 when the image has been processed in accordance with the invention.

Thereafter, the process checks, step 402, if the present pixel is above line 112 in FIG. 3, defining a boundary between scaling areas, or beneath line 113 in FIG. 3, defining another boundary between scaling areas. If the present pixel is above line 112 or beneath line 113 then a scale factor for the y-direction, SCALE FACTOR y, of the present pixel is set to ⅕, step 403. If the pixel is not above line 112 and not beneath line 113 then the scale factor for the y-direction is set to one, step, 404. Thus, the input-SCALE FACTOR y to the scaling unit 310 of FIG. 9 is set to the value of the scale factor for the y-direction of the present pixel.

After the scale factor of the y-direction has been determined, the process continues by checking if the present pixel is positioned to the left of line 114 or to the right of line 115, step 405. If the present pixel is to the left of line 114 or to the right of line 115 then a scale factor for the x-direction, SCALE FACTOR x, of the present pixel is set to ⅕, step 406. If the pixel is not to the left of line 114 or not to the right of line 115 then the scale factor for the x-direction is set to one, step 407. Thus, the input SCALE FACTOR x to the scaling unit 310 of FIG. 9 is set to the value of the scale factor for the x-direction of the present pixel.

When both the scale factor for the y-direction and the scale factor for the x-direction is set, the present pixel is passed to the scaling unit of FIG. 9. This is performed in step 408 by setting the value of PIXEL to the value of the present pixel, defined as PIXEL IN.

Then the process tells the scaling unit of FIG. 9 that there is a pixel available, step 409, by activating PIXEL_AVAIL once. Then the value of XPOS is increased by one, step 410, and thereby the present pixel has changed to be the pixel positioned adjacent to and to the right of the pixel just processed. The new XPOS value is then checked, step 411, for controlling whether the value is equal to the number of columns of the image or not. If XPOS is equal to the number of columns of the image, XPOS is referring to a position outside the image, because the initial value of XPOS was set to zero.

If XPOS does not contain a value corresponding to the number of pixel columns in the input image, i.e. XPOS defines a column within the input image, then the process is returned to step 405 for checking the x-position of the present pixel. If XPOS does contain a value corresponding to the number of columns within the input image, i.e. XPOS defines a column outside the image, then the value of XPOS is set to zero, step 412. Thereafter the value of YPOS is increased by one, step 413. The new YPOS value is checked in step 414.

If YPOS does not contain a value corresponding to the number of pixel rows in the input image, i.e. YPOS defines a row within the input image, then the process is returned to step 402 for checking the y-position of the present pixel and the process continues processing the new row. If YPOS does contain a value corresponding to the number of rows within the input image, i.e. YPOS defines a row outside the image, then the entire image has been processed and the process is terminated.

Figure 11:
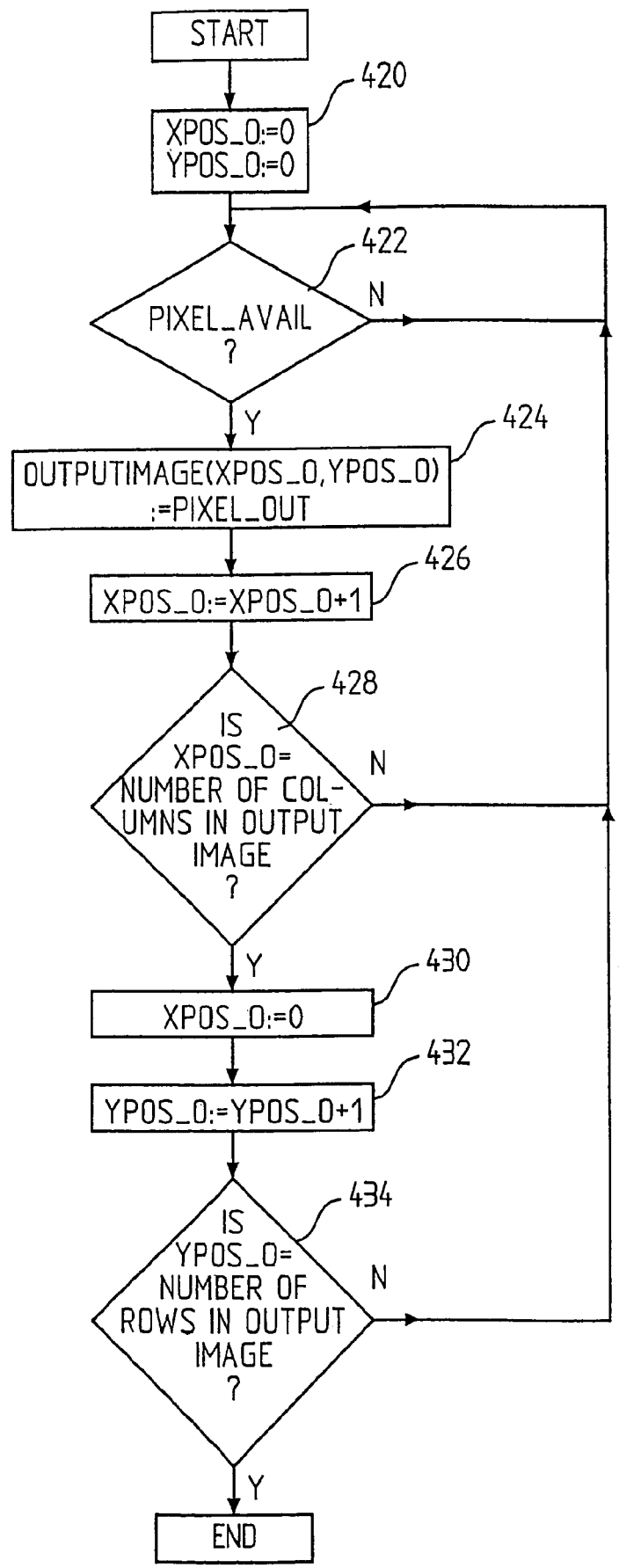

FIG. 11 presents a flowchart describing a possible way to compile the pixel stream from the scaling unit to an output image. Initially pixel identifiers XPOS_O and YPOS_O is set to zero, step 420. Then the process enters a loop, step 422, where the process checks for a signal indicating that a pixel is available. When a pixel is available the pixel, PIXEL_OUT, is stored in an image object, OUTPUTIMAGE, at the position indicated by XPOS_O and YPOS_O, step 424.

Then the next pixel is to be handled, but first the process has to know whether the next pixel is the next pixel in the present row or if the next pixel is the first pixel in the next row. This is achieved by increasing XPOS_O with one, step 426, and check if the new value of XPOS_O is equal to the number of columns in the prospective output image, step 428.

If XPOS_O is not equal to the number of columns in the prospective image the value of XPOS_O still is within the boundaries of the image and therefore the process returns to the loop 422 waiting for the next pixel to be available.

If XPOS_O is equal to the number of rows then the process has processed the last pixel of the present row and prepares to process the first pixel of the next row by setting XPOS_O to zero, step 430, and increasing YPOS_O by one, step 432.

Then the process checks if this next row is a valid row of the image, step 434. If the YPOS_O is not equal to the number of rows in the prospective output image, the process returns to the loop 422, because then more pixels representing the prospective image are to be expected. If the YPOS_O is equal to the number of rows in the prospective image, the processing of this specific image is finished and the process is terminated.

Figure 12:
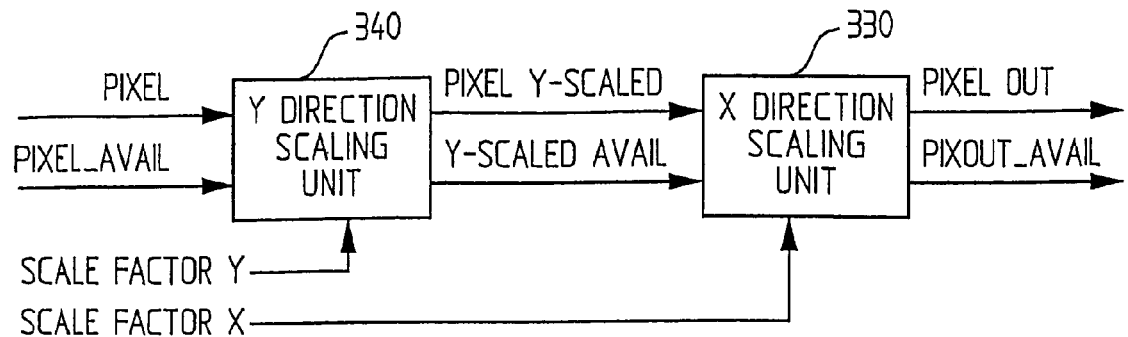
FIG. 12, is schematic view of the scaling unit of FIG. 9, FIG. 13, is a schematic view of the x-direction scaling unit of FIG. 12, FIG. 14, is a schematic view of the y-direction scaling unit of FIG. 12, FIG. 15, is a flowchart of a preferred process in the scale factor controller of FIG. 13 and FIG. 14, FIG. 16, is a flowchart of a preferred process in the Pixel in/out controller of FIG. 13 and FIG. 14, FIG. 17, is a schematic view of a system having a video server comprising processing means for processing an image according to the invention.

Now referring to FIG. 12, the scaling operation is performed within the scaling unit by means of a x-direction-scaling unit 330 and a y-direction-scaling unit 340.

The y-direction-scaling unit 340 starts operating on the pixels of the received image, the y-scaling unit 340 will be described in more detail below. It receives the input signals PIXEL, which delivers the pixels of the image, PIXEL_A-VAIL, which notifies the y-direction scaling unit that a new pixel is available, SCALE FACTOR Y, which is the y-direction scale factor produced in the scale factor selector described in FIG. 10.

When the pixels has been processed in the y-direction scaling unit 340, the scaling unit is forwarding y-scaled pixels, PIXEL Y-SCALED, and a signal indicating that a new y-scaled pixel is available, Y-SCALED AVAIL, to the x-direction scaling unit 330.

The x-direction scaling unit 330 receives these signals and receives also an input signal representing the scale factor in the x-direction, SCALE FACTOR X, which is produced by the scale factor selector described in FIG. 10.

From the x-direction-scaling unit 330 the scaled image is forwarded pixel by pixel via output PIXEL OUT, and each pixel outputted is declared available by means of the output signal PIXOUT_AVAIL. The scaling could also be managed by first processing pixels by means of a x-direction-scaling unit and then processing pixels by means of a y-direction-scaling unit.

Figure 13:
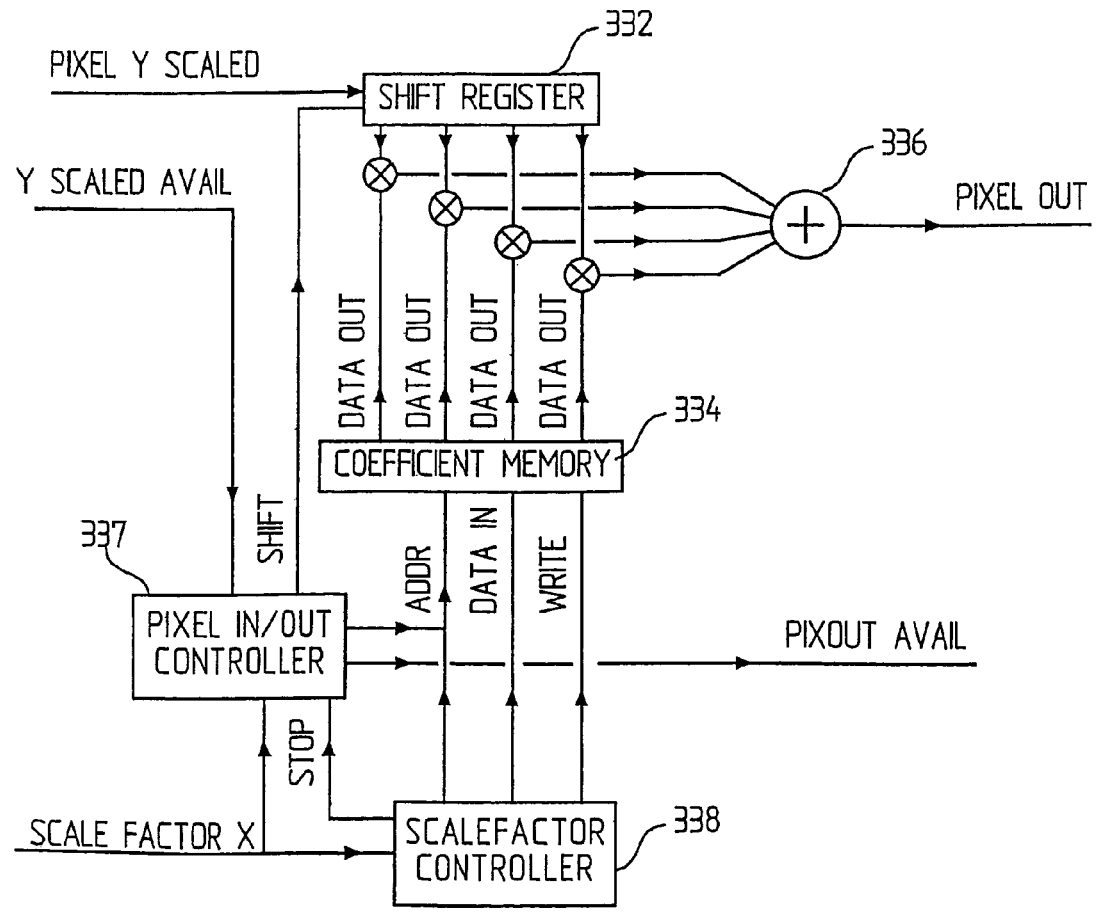

Now referring to FIG. 13, the x-direction scaling unit is constructed and operated as a multirate digital signal processing system, such systems is further described by John G. Proakis and Dimitris G. Manolakis, 1996, "Digital Signal Processing, principles, algorithms, and applications", third edition, chapter 10, Prentice Hall, ISBN 0-13-394338-9.

Said scaling unit receives the pixels from the y-direction-scaling unit via the input signal PIXEL Y-SCALED. The pixels are shifted into the shift register 332, which is part of a FIR-filter (Finite-duration Impulse Response). In order to produce an output pixel, each pixel of the shift register is multiplied with a filter coefficient from a coefficient memory 334. John G. Proakis and Dimitris G. Manolakis describe how to select coefficients in the above-mentioned book. Each result from said multiplication is then added together by means of an adder 336. The result from the addition is then forwarded as an output pixel, PIXEL OUT. Thus, looking at FIG. 13, the four pixels in the shift register 332 is used to calculate one output pixel, PIXEL OUT. The shift register 332 can, however, be of any suitable size.

The x-direction scaling unit further comprises a pixel in/out controller 337 and a scale factor controller 338.

The pixel in/out controller 337 controls the flow of pixels through the x-direction-scaling unit and it manages the scaling of an image. The controller receives the signal Y SCALED AVAIL from the y-direction scaling unit and uses it to control the reception of pixels at the x-direction scaling unit. The pixel in/out controller 337 produces and sends an address signal to the coefficient memory to declare which coefficients to use. The pixel in/out controller 337 also provides the signal PIXOUT AVAIL when a valid pixel is available. The process of the pixel in/out controller 337 will be further described below in connection with FIG. 16.

The scale factor controller 338, which is further described below in connection with FIG. 15, receives the signal SCALE FACTOR X and when the scale factor changes the scale factor controller 338 interrupts the pixel in/out controller 337, and it provides the coefficient memory 334 with coefficients and an address representing a storage address of the desired coefficients. To manage these steps the scale factor controller 338 is able to halt the pixel in/out controller 337 by means of the STOP signal and to store or indicate new coefficients in the coefficient memory 334 via the signal lines ADDR, DATA IN, and WRITE.

Figure 14:
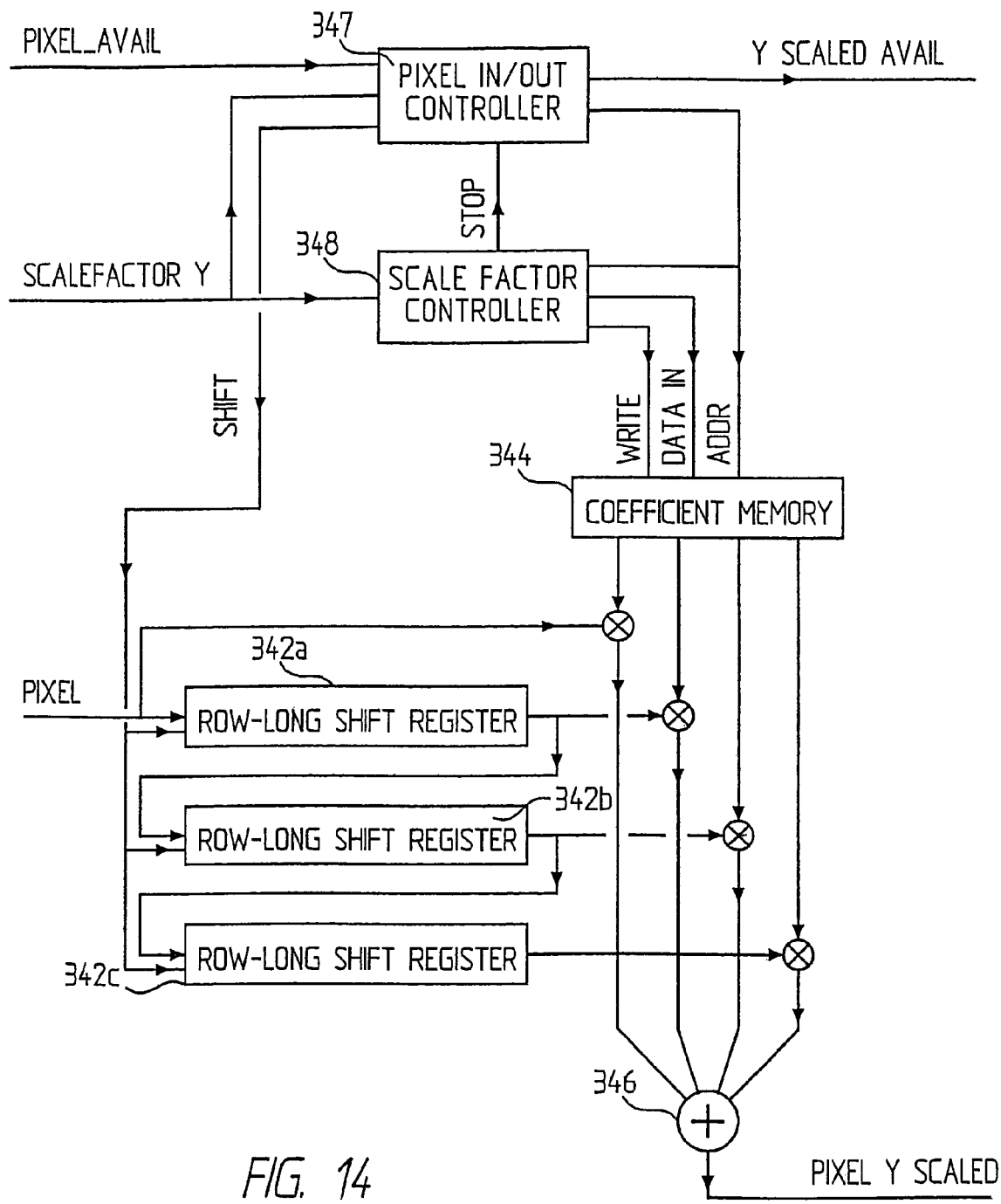

Now referring to FIG. 14, the operation and the construction of the y-direction-scaling unit is similar to the operation and construction of the x-direction-scaling unit. The y-direction-scaling unit comprises shift registers 342a-c, which is part of a FIR-filter. Each shift register 342a-c having a length corresponding to the number of pixels in one row of the image. The pixels are shifted into the shift registers 342a-c so that the pixels that are in a position in the shift registers 342a-c where they are to be multiplied with a coefficient from the coefficient memory 344 all are from the same column of the image processed, e.g. in the case of operating on four pixels and if the latest pixel input, PIXEL, is pixel(x,y) then the pixels outputted from each row-long shift register 342a-c are pixel (x,y−1), pixel (x,y−2), and pixel (x,y−3), respectively.

When a new pixel, e.g. pixel (x+1,y), is inputted and the shift registers 342a-c are shifted, the pixels in position for output in each shift register 342a-c are pixel (x+1,y−1), pixel (x+1,y−2), and pixel (x+1,y−3), respectively.

Each pixel in position for multiplication with a coefficient is then processed in the same way as the pixels in the x-direction scaling unit of FIG. 13, i.e. each of them is multiplied with a coefficient and the result from each multiplication is then added in the adder 346. The output from the adder, PIXEL Y SCALED, is then provided as output from the y-direction-scaling unit.

The y-direction scaling unit also comprises a pixel in/out controller 347 and a scale factor controller 348. These units operate in the same way as the units in the x-direction-scaling unit and will be further described below.

Both the x-direction scaling unit in FIG. 13 and the y-direction scaling unit in FIG. 14 are using the multirate digital signal processing method referred to above. Other methods that could be used are pixel dropping, bilinear interpolation, bicubic interpolation, etc.

Figure 15:
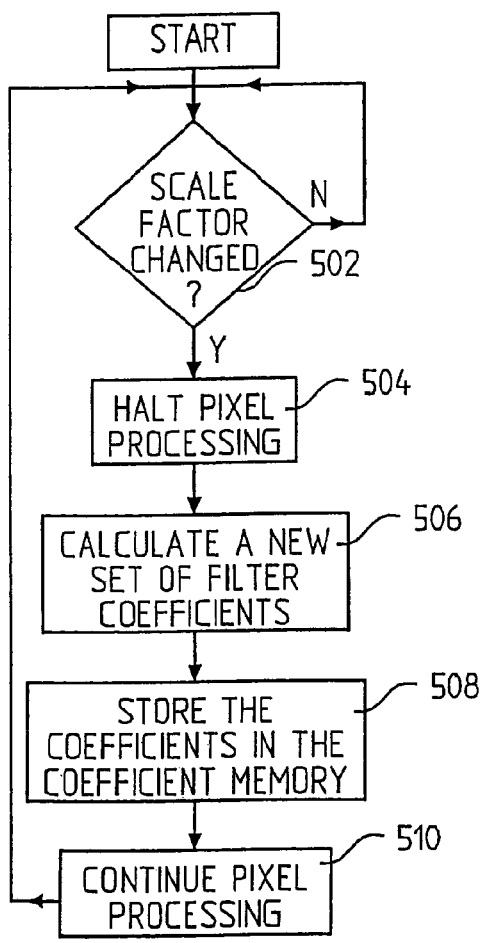

In FIG. 15 the process of the scale factor controller, of which one is included in the x-direction scaling unit and one is included in the y-direction scaling unit, is described.

The process is continuously checking if the scale factor input is changing, step 502. If a change in the scale factor input is detected then the processing of pixels is halted, step 504, by sending a stop signal to the pixel in/out controller. Then a new set of filter coefficients is calculated, step 506. Thereafter the new coefficients are stored in the coefficient memory, step 508. According to another embodiment it is possible to use a bigger coefficient memory, capable of storing more than one complete set of coefficients. Then the scale factor controller only has to calculate the coefficients once and store them all in the coefficient memory. In this embodiment the scale controller only has to change the value of the topmost address when changing between pre-calculated coefficients. Then the scale factor controller releases the pixel in/out controller and the processing of the pixels is resumed, step 510.

Figure 16:
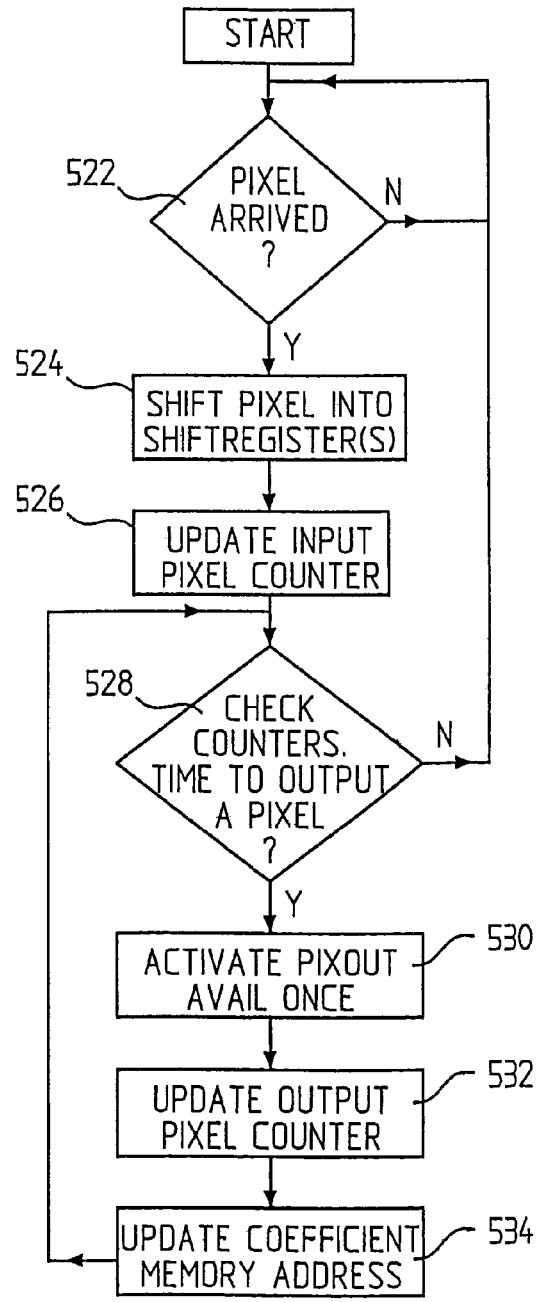

In FIG. 16 the process of the pixel in/out controller is described. The process in the figure relates to the process of the controller of the x-direction-scaling unit. However the differences between the controllers of the different scaling units are small and will be indicated in the following description when such differences arises.

The pixel in/out controller continuously checks if a new pixel has arrived, step 522. If a new pixel arrives then it is shifted into the shift register 332 of the x-direction scaling unit in FIG. 13, or the row-long shift register 342a of the y-direction scaling unit in FIG. 14, step 524. In the y-direction scaling unit the shift operation also shifts the foremost pixel of row-long shift register 342a into the row-long shift register 342b and the foremost pixel of row-long shift register 342b into the row-long shift register 342c, see FIG. 14. Then an input pixel counter is updated, step 526.

When the counter is updated the process makes a decision regarding whether a pixel shall be outputted or not, step 528. The decision is based on the value of the counter and the value of the scale factor indicated by the input signal SCALE FACTOR X in the x-direction scaling unit or SCALE FACTOR Y in the y-direction-scaling unit. In the y-direction scaling unit the counter has to keep track of both the present row being processed and how many pixels of said row that have been processed. Thus, if the scale factor for example is ⅕, i.e. the area where the present pixel is positioned is to be downscaled using a factor five, then the pixel in/out controller of the x-direction scaling unit makes sure that only every fifth pixel is-outputted. If we use the same example on the pixel in/out controller of the y-direction scaling unit then the pixel in/out controller makes sure that only every fifth row of pixels is outputted.

If no output shall be made the process returns to checking if a new pixel has arrived at step 522. However, if an output shall be made the signal PIXOUT AVAIL/Y SCALED AVAIL is activated, step 530, and the pixel counter is updated, step 532. Then the coefficient memory address is updated, step 534, and the process is returned to step 528 for checking if a pixel shall be outputted. Note that for the y-direction-scaling unit the coefficient memory address is only changed when a new line is to be outputted, i.e. during processing of one line only one set of coefficients is used.

Figure 17:
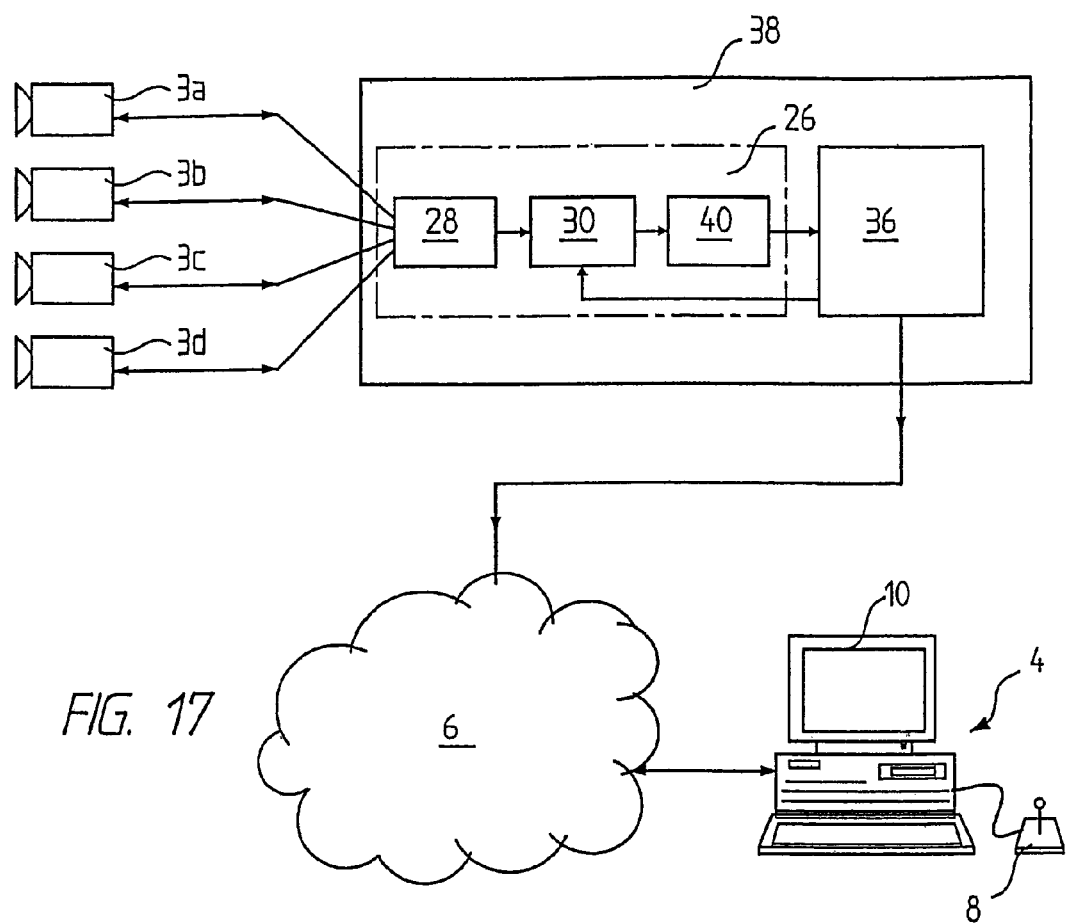

Now referring to FIG. 17, according to another aspect of the system, one or a plurality of ordinary surveillance cameras 3a-c is connected to a video server 38. The video server is connected to a computer network 6 for transmission of the processed digital image stream to a presentation unit.

Said video server 38 comprises digital processing means 26 including scaling means 30, which corresponds to the above mentioned scaling means, for scaling of the view from the one or the plurality of the-surveillance cameras 3a-c. The digital processing means 26 also includes a DSP 40. The DSP 40 of this embodiment operates essentially in the same way as the DSP 32 of FIG. 2. However, one great difference is that the DSP 40 is converting analogue video signals to digital signals. An example of a DSP that could be used as DSP 40 in this embodiment is SAA7111 from Philips Semiconductors. The reference numerals in FIG. 17 that correspond to reference numerals in FIGS. 1 and 2 indicate means of essentially the same functionality and therefore the functions of these means are not repeated.

According to another aspect of the invention a presentation unit, e.g. the presentation unit 4 in FIG. 1, is provided with a scaling means according to the invention. Thus the scaling of the image will be performed at the destination of an image.

Figure 18:
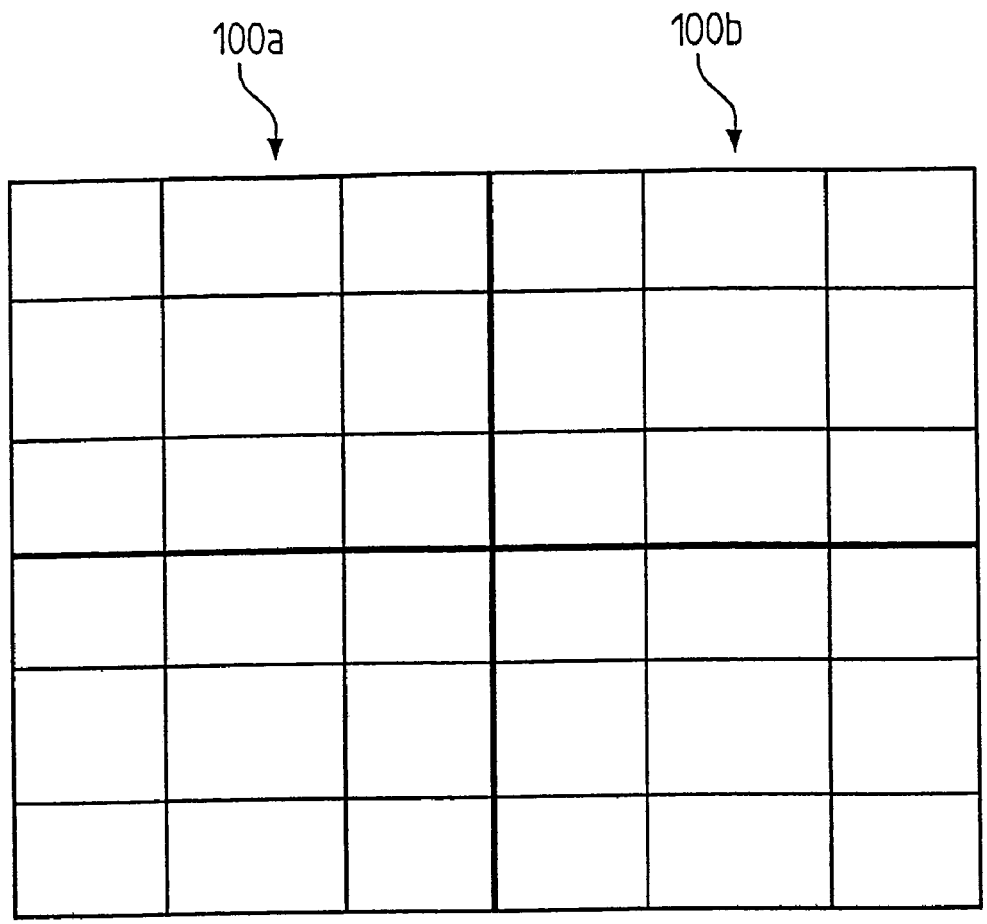
FIG. 18, is showing an image comprising the images from four different cameras and their scaling areas before scaling.

Now referring to FIG. 18, in one preferred embodiment of the invention four images is presented on the same display simultaneously. In an embodiment of the invention, e.g. the one described in FIG. 17 or if the scaling is performed within a receiving equipment for monitoring four images, the four images 100a-d is compiled to one new image comprising all four images as shown in FIG. 18.

In the new image the scaling areas of each individual image are defined. It is then possible to use the same scaling process as described above. The only significant difference is that the process has a greater number of boundaries to pay attention to during the scaling operation.

Figure 19:
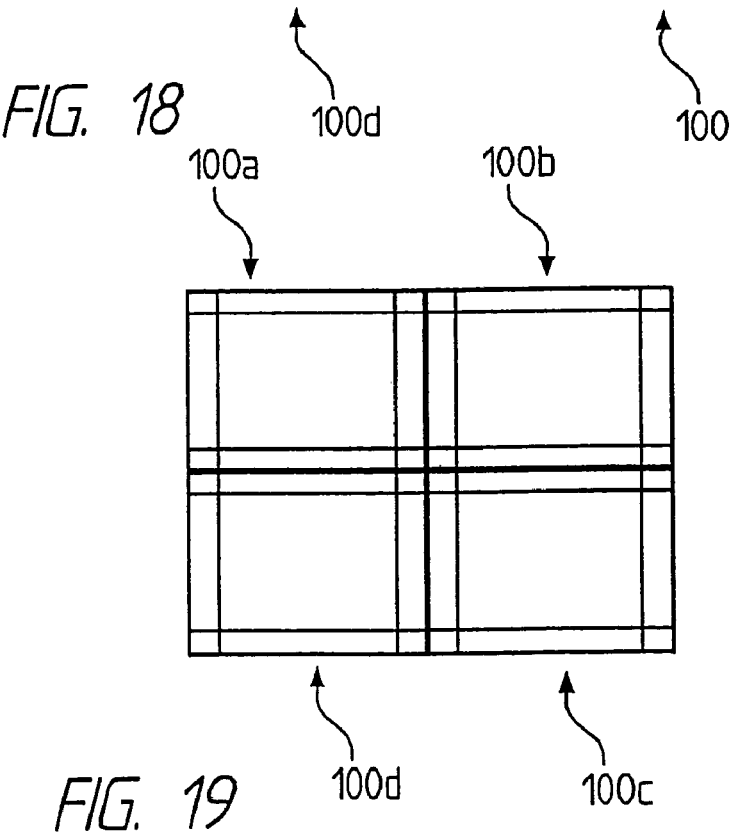
FIG. 19, is showing an image comprising the images from four different cameras and their scaling areas after scaling.

The resulting image of such scaling operation is presented in FIG. 19. When the images, i.e. the new image, have been processed it can be transformed to single images again for presentation as separate images or they can be kept grouped together for presentation as one image.

The invention claimed is:

1. A method for digital processing a frequently updated image from a camera comprising:
    receiving at a scaling unit a digital image as a digital representation of the frequently updated image;
    defining a first scaling area of the digital image and a peripheral scaling area of the digital image, which encloses the first scaling area to selectively control a display of the first scaling area of the digital image at a position within a display of the peripheral scaling area of the digital image;
    scaling the peripheral scaling at the scaling unit area differently than the first scaling area so that the peripheral scaling area is downscaled in relation to the first scaling area, wherein the first scaling area is uniformly scaled in both a vertical and a horizontal direction; and dynamically changing the peripheral scaling area in response to instructions for moving the position of the display of the first scaling area of the digital image within the display of the peripheral scaling area of the digital image.

2. The method of claim 1, wherein the step of dynamically changing said peripheral scaling area comprises the step of redefining a position of a boundary between the first scaling area and the peripheral scaling area.

3. The method of claim 1, wherein the peripheral scaling area includes: a second scaling area positioned above the first scaling area, a third scaling area positioned below the first scaling area, a fourth scaling area positioned to the left of the first scaling area, and a fifth scaling area positioned to the right of the first scaling area, wherein the stop of dynamically changing said peripheral scaling area comprises the step of redefining the position of boundaries of the second, third, fourth, and fifth scaling areas that are adjacent to the first scaling area.

4. The method of claim 1 wherein the defining the first and peripheral scanning areas collectively represent the entire digital image.

* * * * *

UNITED STATES PATENT AND TRADEMARK OFFICE
CERTIFICATE OF CORRECTION

| | | |
|---|---|---|
| PATENT NO. | : 7,505,635 B2 | Page 1 of 1 |
| APPLICATION NO. | : 10/398983 | |
| DATED | : March 17, 2009 | |
| INVENTOR(S) | : Alm et al. | |

It is certified that error appears in the above-identified patent and that said Letters Patent is hereby corrected as shown below:

At claim 3, column 12, line 4, delete the word "stop" and insert --step--.

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,505,635 B2
APPLICATION NO. : 10/398983
DATED : March 17, 2009
INVENTOR(S) : Alm et al.

It is certified that error appears in the above-identified patent and that said Letters Patent is hereby corrected as shown below:

At claim 1, column 10, line 66, delete "scaling the peripheral scaling at the scaling unit area differently" and insert --scaling the peripheral scaling area at the scaling unit differently--.

Signed and Sealed this
Sixteenth Day of August, 2011

David J. Kappos
*Director of the United States Patent and Trademark Office*